Nov. 25, 1924.

C. HODGKINS 1,517,213

MOVABLE HEADLIGHT

Filed Sept. 23, 1922   2 Sheets-Sheet 1

WITNESS: Paul M. Hunt

INVENTOR C. Hodgkins
BY Victor J. Evans
ATTORNEY

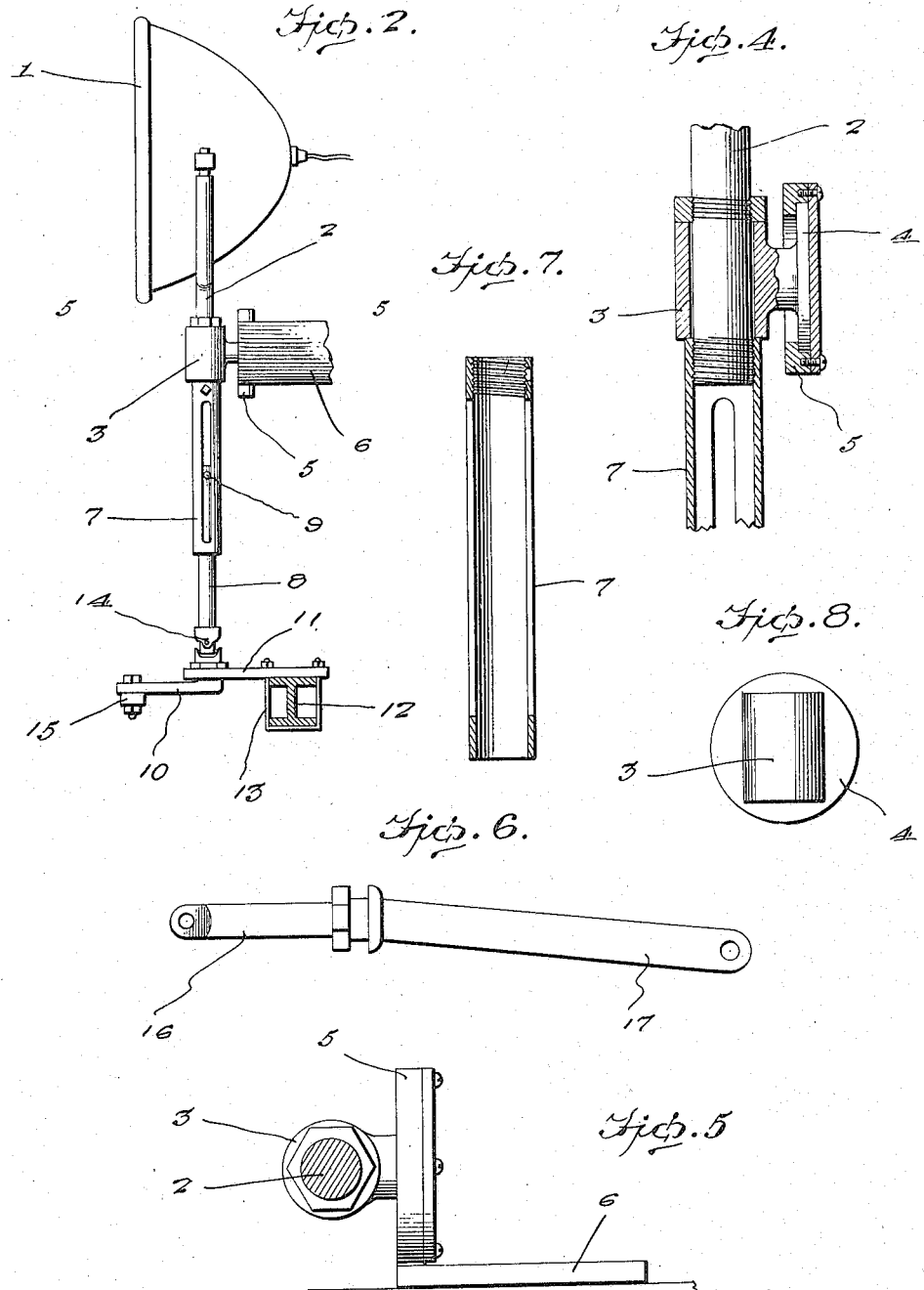

Patented Nov. 25, 1924.

1,517,213

UNITED STATES PATENT OFFICE.

CHARLES HODGKINS, OF ROWLEY, MASSACHUSETTS.

MOVABLE HEADLIGHT.

Application filed September 23, 1922. Serial No. 590,066.

*To all whom it may concern:*

Be it known that I, CHARLES HODGKINS, a citizen of the United States, residing at Rowley, in the county of Essex and State of Massachusetts, have invented new and useful Improvements in Movable Headlights, of which the following is specification.

This invention relates to movable headlamps for motor vehicles, the general object of the invention being to provide means for causing the lamps to move with the front wheels, so that the rays of light will follow the road on curves as well as on straight stretches.

Another object of the invention is to provide means whereby the swaying of the vehicle will not affect the lamps to any appreciable amount.

The invention also consists in certain other features of construction and in the combination and arrangement of the several parts, to be hereinafter fully described, illustrated in the accompanying drawings and specifically poined out in the appended claim.

In describing my invention in detail, reference will be had to the accompanying drawings wherein like characters denote like or corresponding parts throughout the several views, and in which:—

Figure 2 is a side view thereof.

Figure 4 is a section on line 4—4 of Figure 1.

Figure 5 is a section on line 5—5 of Figure 2.

Figure 6 is a view of the spindle arm 17 and the arm 16 attached thereto.

Figure 7 is a longitudinal sectional view through the tubular member 7.

Figure 8 is a front view of the supporting sleeve 3 and its disc 4.

Figure 1:
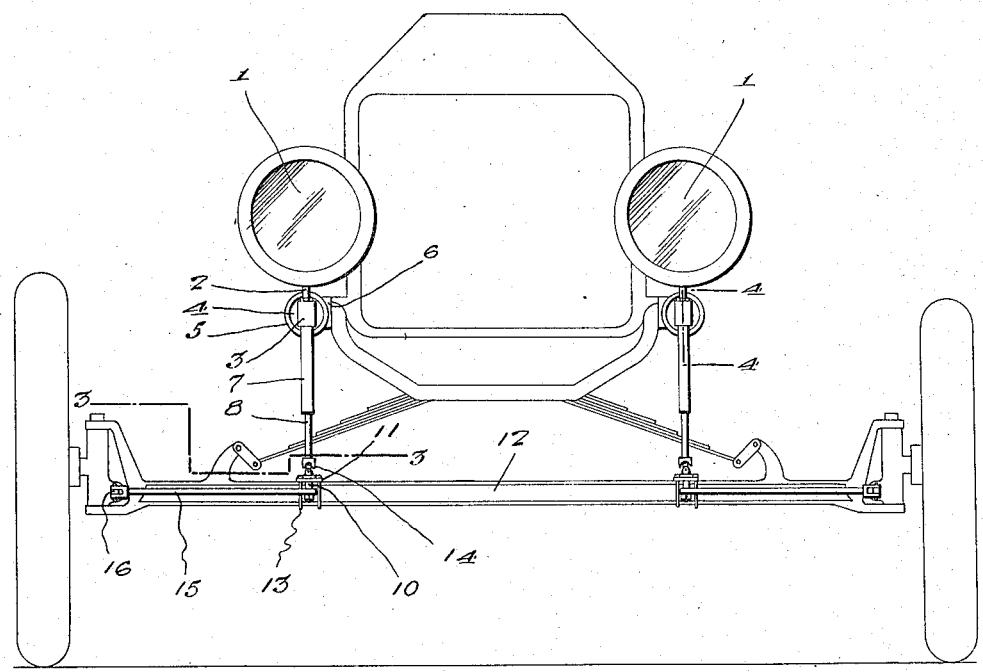
Figure 1 is a front view of a vehicle constructed with my head lamps.
Figure 3:
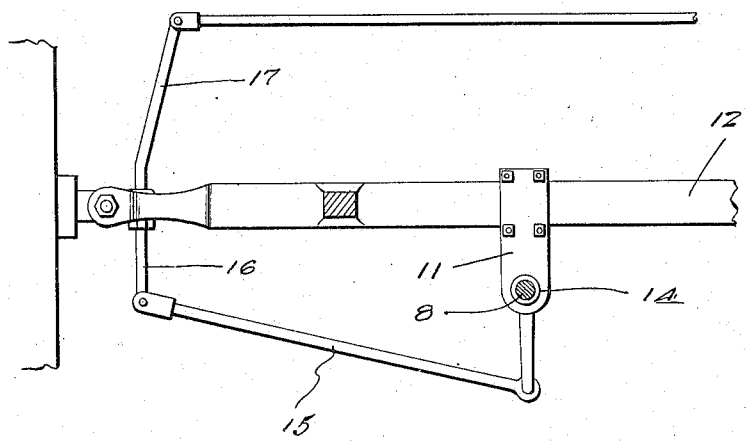
Figure 3 is a section on line 3—3 of Figure 1.

In these views, 1 indicates the head lamps of the vehicle which are supported on the standards 2 in the usual manner. Each standard is rotatably mounted in a sleeve 3, the sleeve being connected to a disc 4 which is rotatably mounted in a circular socket 5 which is formed in a bracket 6 which is fastened to the car. A slotted tubular member 7 is connected with the lower end of each standard and a rod 8 engages each member with projections 9 thereon entering the slots so that the turning of the rods will cause the tubular members and the lamps to turn. A crank 10 is carried by a seat or bracket 11 which is fastened to the front axle 12 of the car by the U bolt 13 and a gimbal joint 14 connects this crank with the lower end of the rod 8. A link 15 connects each crank with an arm 16 which is connected with the spindle arm 17.

From the above it will be seen that the turning movement of the front wheels will be communicated to the lamps so that curved parts of the road will be lighted as the vehicle rounds the same, thus enabling the driver to see where he is going. The arrangement of the parts will permit the device to work even when the car is traveling over rough stretches of road and the swaying movement of the car will not interfere with the operation of the lamp parts.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having thus described my invention what I claim is:—

In a motor vehicle, an upper and lower bracket attached to a part of the vehicle, the upper bracket having a horizontally arranged socket therein, a sleeve, a disc connected therewith and rotatably mounted in the socket, a head lamp having its standard rotatably mounted in the sleeve, a slotted tubular member connected with the lower end of the standard, a rod fitting in the tubular member and having a projection thereon engaging the slot therein, a crank rotatably supported in the lower bracket, a flexible joint between the crank and the lower end of the rod, an arm connected with the steering mechanism and a link connecting the arm with the crank.

In testimony whereof I affix my signature.

CHARLES HODGKINS.